April 6, 1943.  Y. A. BOUGET  2,315,586
TOOL
Original Filed June 28, 1940
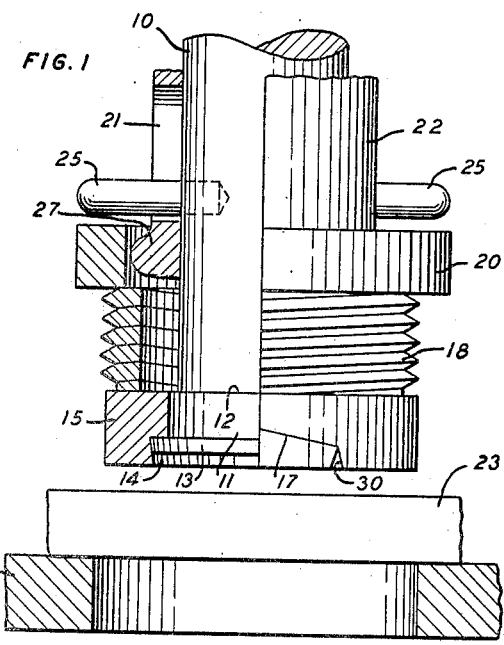
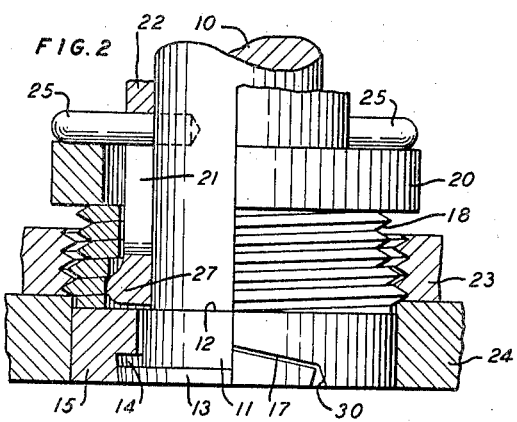
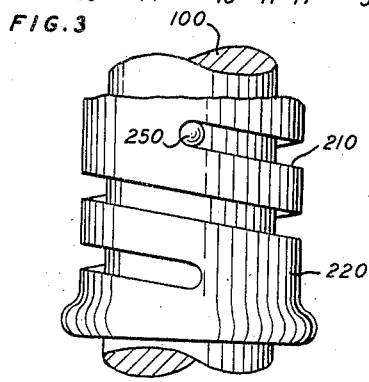
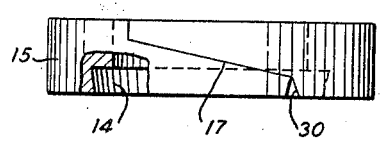
INVENTOR
Y. A. BOUGET
BY
E. R. Nowlan
ATTORNEY Patented Apr. 6, 1943

2,315,586

UNITED STATES PATENT OFFICE 2,315,586

TOOL

Yves A. Bouget, West Orange, N. J., assignor to Western Electric Company, Incorporated, New York, N. Y., a corporation of New York Original application June 28, 1940, Serial No. 342,880. Divided and this application October 28, 1941, Serial No. 416,803

9 Claims. (Cl. 164—124)

This invention relates to tools, and more particularly to perforating and threading tools.

This application is a division of copending application Serial No. 342,880 filed June 28, 1940, by the same inventor.

Numerous methods have been followed in forming threads in tubular articles constructed of soft materials such as aluminum and its alloys, lead and its alloys, and various other materials including plastics, but in cases where a threaded opening is to be produced in a material where no opening or tubular formation of such material is provided, the material must be perforated before the threads can be formed. This, therefore, requires two operations. When such operations are performed by separate machines the cost of an extra machine and the maintenance thereof, in addition to the cost of transferring the material from one machine to another, exists. It has, therefore, been found advantageous to form both the perforating and threading operations with a single tool which requires but a single machine for the operation thereof.

An object of the invention is to provide a tool which is simple in structure and which is highly efficient in perforating and threading materials.

With this and other objects in view, the invention comprises a tool having a perforating member followed by a thread forming element for the successive perforating and threading of materials during a single movement of the tool relative to a material.

Other objects and advantages will be apparent from the following detailed description when taken in conjunction with the accompanying drawing, wherein:

Fig. 1 is a front elevational view of the tool, partially in section, shown in a position ready to begin a punching and threading operation;

Fig. 2 is a fragmentary front elevational view, partially in section, of the tool at the end of its perforating and threading operation;

Fig. 3 is a fragmentary front elevational view illustrating another form of cam-like element for controlling the threading elements;

Fig. 4 is a front elevational view, partially in section, of the perforating member, and Fig. 5 is a front elevational view of another form of perforating member.

Referring now to the drawing, the tool consists of a shank 10 having a member 11 secured thereto or formed integral therewith. The member 11 is larger in diameter than the shank providing a shoulder 12 and an annular control portion 13 extending outwardly therefrom, the latter being provided with a tapered peripheral surface disposed in a recess 14 of a die or perforating member 15. The vertical surface of the recess 14 is tapered to conform to the tapered surface of the control portion 13 of the shank to cause expansion of the die member 15 prior to the perforating operation. It will be noted that the die member is apertured centrally to receive the enlarged end portion 11 of the shank, and is also cut at 17 to provide interfitting ends and allow the die member to be expanded to the perforating position through the wedging action of the control portion 13 in moving downwardly in the recess 14.

A thread forming element 18 formed of a continuous resilient material in spiral formation having outer edges thread-shaped or V-shaped in cross section and normally of the contour shown in Fig. 1, rests upon die member 15. An annular holding member 20 rests upon the thread forming element 18 and is held against lateral displacement by a cam-like actuating member 22. The actuating member 22 is disposed concentric with the shank 10 and is movable thereon toward or away from the thread forming element 18.

Suitable means (not shown) such as equipment for a machine in which the tool may be mounted for use is provided to move the shank with the other elements relative to a material 23 positioned on a die plate 24. Additional means may also be provided to move the actuating member 22 a definite distance and at a desired rate of speed after movement of the shank 10 has ceased. This additional movement of the member 22 relative to the shank 10 as well as the thread forming element 18 causes lateral movement of the thread forming element throughout its length from beginning to end, to form threads in an aperture previously formed by the die members 15 and 24. In the embodiment shown in Figs. 1 and 2 the actuating member 22 has diametrically opposed elongate apertures 21 through which pins 25 extend. The pins 25 are rigidly supported by the shank 10 and extend beyond the actuating member 22 parallel with and a definite distance from the upper surface of the holding member 20. In order that the portions of the threading element 18 will be gradually moved laterally into thread forming positions, an outwardly projecting cam portion 27 is formed at the lower end of the member 22 and provided with a curved surface so that when it is moved through the thread forming element the portions of the latter will be gradually moved from the beginning or upper end of the thread forming element to the lower end thereof.

The support for the die plate 24, the means for feeding the material to the tool and other means such as that for moving the shank 10 and the actuating member 22, have not been shown, as they are not believed necessary in illustrating the invention, which is believed to lie in the tool per se equipped for performing both the perforating and threading operations.

During the operation of the tool, let it be assumed that the tool is in the position shown in Fig. 1, with a material, to be provided with a threaded aperture, disposed in place, and that the tool is lowered to a point where the die member 15 engages the material. Up to this point in the operation no change takes place in the relative positions of the elements from that shown in Fig. 1. However, during the next immediate movement of the shank downwardly the die member 15 will rest on the material until the lower surface of the shank rests upon the material and the pins 25 rest upon the annular holding member 20. During this relative movement of the shank and the die member 15 the die member has been expanded to its perforating position due to the wedging action existing between the annular control portion 13 and the tapered surface of the recess 14. Further movement of the tool will cause the die member 15, through cooperation of the die plate 24, to perforate the material. The shank, together with the associated parts of the tool, continues in its downward movement to the position shown in Fig. 2, with the die member 15 moved completely through and beyond the material.

Immediately following this the member 22, which has been moving with the shank, continues its movement downwardly. Due to the fact that the portion 27 of the member 22 lies in a plane at right angles to the center line of the thread forming element 18 and that the element is spiral in formation, the portion 27 will engage the upper end of the thread forming element, first forcing this portion laterally to form its thread-like contour in the perforated wall of the material. The portion 27 of the member 22 will, therefore, effectively cause the spiral thread forming element to move laterally in a progressive movement from the beginning to the end of the element.

At this point in the operation, that is, when the threads have been formed, the expanded die member 15 is slightly larger than the inner diameter of the threaded aperture in the material, due to the fact that in the forming of the threads, in what might be termed soft material, a certain portion of the material tends to flow in and fill recesses formed by adjacent convolutions of the thread forming element. Therefore, during the return movement of the tool the actuating member 22 is first moved upwardly to give a repeated thread forming operation but in reverse order, moving the portions of the thread forming element 18 laterally from the previously so-called end thereof to the beginning thereof and until the member 22 has been moved free of the thread forming element. At this time the shank 10 is moved upwardly relatively to the die member 15 until the lateral surface of the recess 14 rests upon the upper surface of the control portion 13, during which relative movement the die member, due to its resilient nature, is allowed to contract so that it may be moved freely through the threaded aperture during the further movement of the shank upwardly. At this point attention is directed to the formation of the die member 15, particularly the cut 17 therein, which is formed so that with the die expanded there will exist a continuous cutting edge which might include a small portion of the die member along the cut 17. It will further be observed that the lower end of the cut 17 has walls 30 which extend transversely away from each other, providing a V-shaped groove the outer edges of which form shearing edges assisting in the perforating operation. Attention is also directed to the pins 25, through which the force of the shank 10 is directed through the holding member 20 and the thread forming element 18 to the die member 15. It will, therefore, be observed that through one operating cycle of the tool the material will be apertured and threads will be formed in the aperture, the punch member being conditioned prior to the forming of the aperture to contract for its removal through the aperture after threads have been formed thereon. It will further be observed that the threads are not formed simultaneously, which would require many times the present required pressure and thus require more complicated and expensive structures, but that the threads are formed in a continuous successive manner from beginning to end.

The embodiment shown in Fig. 3 illustrates an actuating member 220 movably disposed on a shank 100 and identical with the actuating member 22 in every detail excepting a spiral opening 210 therein, in place of the vertical opening 21. The walls of the spiral opening 210 and their association with a pin 250, carried by the shank, cause rotation of the member in the direction of the spiral formation of the thread forming element during downward movement of the member relative to the shank. The actuating member 220, therefore, effectively rolls the portions of the thread forming element successively into thread forming positions. The actuating member 220, as shown in Fig. 3, is in its downward position.

Other embodiments of the invention might include actuating members similar to those shown at 22 and 220 with the lower engaging portions, such as 27, extending in various angular directions with respect to the center line of the tool to cause variation in the progressive pressure on the thread forming element. Also various types of cuts (17) may be used for the die member 15. For example, as shown in Fig. 5, the cut 170 in the die 150 may start at one point 171 at the bottom of the die and extend spirally one and one-half times through the circular distance of the die and terminate at a point 172 at the top of the die in a vertical plane with the starting point. With this type of cut in the die the associated portions throughout the circular area of the die will balance in the amount of pressure required to flex them, resulting in a truly circular die in expanded as well as contracted positions.

The embodiments of the invention herein disclosed are merely illustrative and may be modified and departed from in many ways without departing from the spirit and scope of the invention as pointed out in and limited solely by the appended claims.

What is claimed is:

1. A tool comprising a die movable in a direction toward a material and rendered expansible by a split therein extending transverse to the said direction, means to cause expansion of the die, and movable means adapted to move the die thus expanded through the material to perforate the material.

2. A tool comprising a die movable in a direction toward a material and rendered expansible by a split therein extending transverse to the said direction, an element movable in one direction relative to the die to cause expansion thereof, and movable means adapted to move the die thus expanded through the material to perforate the material.

3. A tool comprising a die movable in a direction toward a material and rendered expansible by a split therein extending transverse to the said direction, an element movable in one direction relative to the die to cause expansion thereof, and movable means adapted to move the die thus expanded through the material to perforate the material, the element movable in a reverse direction to release the die for expansion and removable through the perforation.

4. A tool comprising a die movable in a direction toward a material and rendered expansible by a split therein extending transverse to the said direction, an element movable in one direction relative to the die to cause expansion thereof, means to limit the movement of the element to limit the degree of expansion of the die, and movable means adapted to move the die thus expanded through the material to perforate the material.

5. A tool comprising a die, with a cutting edge, movable in a direction toward a material and rendered expansible by a split therein extending transverse to the said direction to effect variations in the size of the cutting edge free of interruptions in the cutting edge, and means to cause expansion of the die, and movable means adapted to move the die thus expanded through the material to perforate the material.

6. A tool comprising a die, with an effectively continuous peripheral cutting edge of predtermined dimensions, movable in a direction toward a material and rendered expansible by a split therein extending transverse to the said direction to effect variations in the dimensions of the cutting edge while maintaining the cutting edge effectively continuous, and means to cause expansion of the die, and movable means adapted to move the die thus expanded through the material to perforate the material.

7. A tool comprising a die, with an effectively continuous peripheral cutting edge of predetermined dimensions, movable in a direction toward a material and rendered expansible by a split therein extending transverse to the said direction to effect variations in the dimensions of the cutting edge while maintaining the cutting edge effectively continuous, an element movable in one direction relative to the die to cause expansion thereof, and movable means adapted to move the die thus expanded through the material to perforate the material.

8. A tool comprising a die, with an effectively continuous peripheral cutting edge of predetermined dimensions, movable in a direction toward a material and rendered expansible by a split therein extending transverse to the said direction to effect variations in the dimensions of the cutting edge while maintaining the cutting edge effectively continuous, an element movable in one direction relative to the die to cause expansion thereof, and movable means adapted to move the die thus expanded through the material to perforate the material, the element movable in a reverse direction to release the die for expansion and removable through the perforation.

9. A tool comprising a die, with an effectively continuous peripheral cutting edge of predetermined dimensions, movable in a direction toward a material and rendered expansible by a split therein extending transverse to the said direction to effect variations in the dimensions of the cutting edge while maintaining the cutting edge effectively continuous, an element movable in one direction relative to the die to cause expansion thereof, means to limit the movement of the element to limit the degree of expansion of the die, and movable means adapted to move the die thus expanded through the material to perforate the material, the element movable in a reverse direction to release the die for expansion and removable through the perforation.

YVES A. BOUGET.